Feb. 20, 1968     A. J. EBERLEIN     3,369,772
CONTROL APPARATUS Filed Oct. 8, 1964     9 Sheets-Sheet 2

INVENTOR.
ALLEN J. EBERLEIN
BY

Feb. 20, 1968   A. J. EBERLEIN   3,369,772
CONTROL APPARATUS
Filed Oct. 8, 1964   9 Sheets-Sheet 4

FIG. 5

INVENTOR.
ALLEN J. EBERLEIN
BY *[signature]*

Feb. 20, 1968   A. J. EBERLEIN   3,369,772
CONTROL APPARATUS

Filed Oct. 8, 1964   9 Sheets-Sheet 5

INVENTOR.
ALLEN J. EBERLEIN
BY

United States Patent Office 3,369,772
Patented Feb. 20, 1968

3,369,772
CONTROL APPARATUS
Allen J. Eberlein, St. Anthony, Minn., assignor to
Honeywell Inc., a corporation of Delaware
Filed Oct. 8, 1964, Ser. No. 402,405
5 Claims. (Cl. 244—3.2)

This invention relates to the field of control apparatus and more particularly to apparatus for controlling the attitude of a moving body, particularly one in ballistic flight. It has been specifically applied to a vehicle which is launched as a part of the payload of a spin stabilized rocket, and has significant advantages particularly in reducing errors due to spin drift of two-axis gyroscopes and in making possible unlimited controlled changes in the vehicle pitch attitude without either encountering gimbal lock or requiring redundant gimbals, torquing of the gyros in flight, or other intricate, expensive, and heavy expedients.

The broad object of the invention is therefore to provide improved attitude control apparatus. Subordinate objects of the invention are to provide improved attitude control apparatus which makes possible unlimited controlled change in the pitch attitude of a vehicle without danger of gimbal lock, and to provide improved attitude control apparatus which for the intended vehicle maneuvers is relatively insensitive to spin drift of the gyroscopes.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

Briefly, the invention comprises apparatus capable of post-launch operation to stabilize the attitude of a vehicle and then cause it to pitch over to a new desired attitude, which apparatus may be preset in accordance with the flight profile of any proposed flight and moreover is not unduly influenced by launcher adjustments or stabilizing spin of the vehicle during launch.

In space research, information is needed on the effect of different re-entry corridors and different construction materials on bodies re-entering the earth's atmosphere from space. It is not necessary to define a re-entry corridor here further than to say it is a function of the direction and magnitude of the velocity of the re-entering body, and it may be noted that for the purpose of re-entry the atmosphere may be said to end at an altitude of of about 400,000 feet or 75 miles. A relatively inexpensive research procedure for studying re-entry characteristics has been found to lie in making the body a part of a "velocity package" or re-entry vehicle carried on first and second stage rocket engines but separable therefrom in flight. The velocity package has been found to conveniently comprise the payload or body to be tested, third and fourth propulsion stages, and an attitude controller including rate and displacement gyroscopes and reaction jets controlled thereby and powered from a self-contained source of compressed gas. At the time of launch the entire vehicle is aerodynamically stable, but after separation from the first two stages the velocity package is not, there remaining some ambient atmosphere at this time. It was found convenient to spin stabilize the package by spinning the entire vehicle during launch, using canted fins.

After separation the velocity package coasts on up to a predetermined altitude in the neighborhood of 450,000 feet. Somewhere above 300,000 feet altitude its spin is reduced to zero by a "Yo-Yo" despin device of conventional nature. The velocity package next positions itself with a predetermined longitudinal plane vertical, and then rotates through a predetermined pitch-over angle about a transverse axis perpendicular to that plane. The trajectory of the vehicle has of course been observed by radar, and if this discloses deviation from the intended trajectory, suitable corrections in attitude may be produced by radio control. The velocity package is again spun up, insuring stability as the atmosphere is again approached, and the attitude controller is jettisoned so that the propulsion stages may be fired, projecting the body to be tested into the desired re-entry corridor. As soon as the final stages have fired they are separated and the body completes its re-entry.

From the foregoing it will be evident that the attitude controller is operative during only an intermediate portion of the flight, but that also it must remain operable during the stresses and accelerations of launching and the accompanying axial spin. It has been found that the range of pitch-over angles of general interest is from 40° to 160°, so that a change in attitude of greater than 90° must be capable of accomplishment by the control unit. Finally, the control system must quickly cause the velocity package to achieve a particular roll attitude after it has been despun. Of course, high accuracy is necessary, and the errors introduced from known sources must be mimized. All the above must be accomplished at a minimum expense, if the greatest practical number of experiments are to be conducted.

The attitude controller comprises the gas containers and jets, a set of three rate gyroscopes aligned with the three orthogonal axes of the vehicle, and a pair of displacement gyroscopes, together with radio controlled apparatus, a programmer, a battery pack, an inverter, and the necessary interconnecting system circuitry. The problem of a large required pitch over angle could have been solved in conventional fashion by providing torquable gyroscopes and torquing them during flight, but this would introduce many problem areas, for example those involving timers, torquing accuracy, power supplies, and vehicle stability. It would also have been possible to construct a system using redundant gimbals, with the concomitant increase in weight and complexity. By practicing my invention, however, it is possible to use simple, double-gimbal gyroscopes and entirely avoid torquing the gyroscopes in flight, all such torquing being confined to a pre-launch alignment period. While this change slightly increases the complexity and cost of the ground service equipment, it reduces the cost of the attitude controller by at least two-thirds, which is a very substantial saving when it is considered that many such controllers may be served in turn by a single ground service installation.

Although the core of my invention lies in installing the attitude gyroscopes in a particular manner and initially bringing their spin axes into a predetermined orientation, it will not be possible to fully understand the inventive contribution without also understanding the reason for the particular relations required and the means for accomplishing the initial setting expeditiously and in large part automatically.

Figure 1:
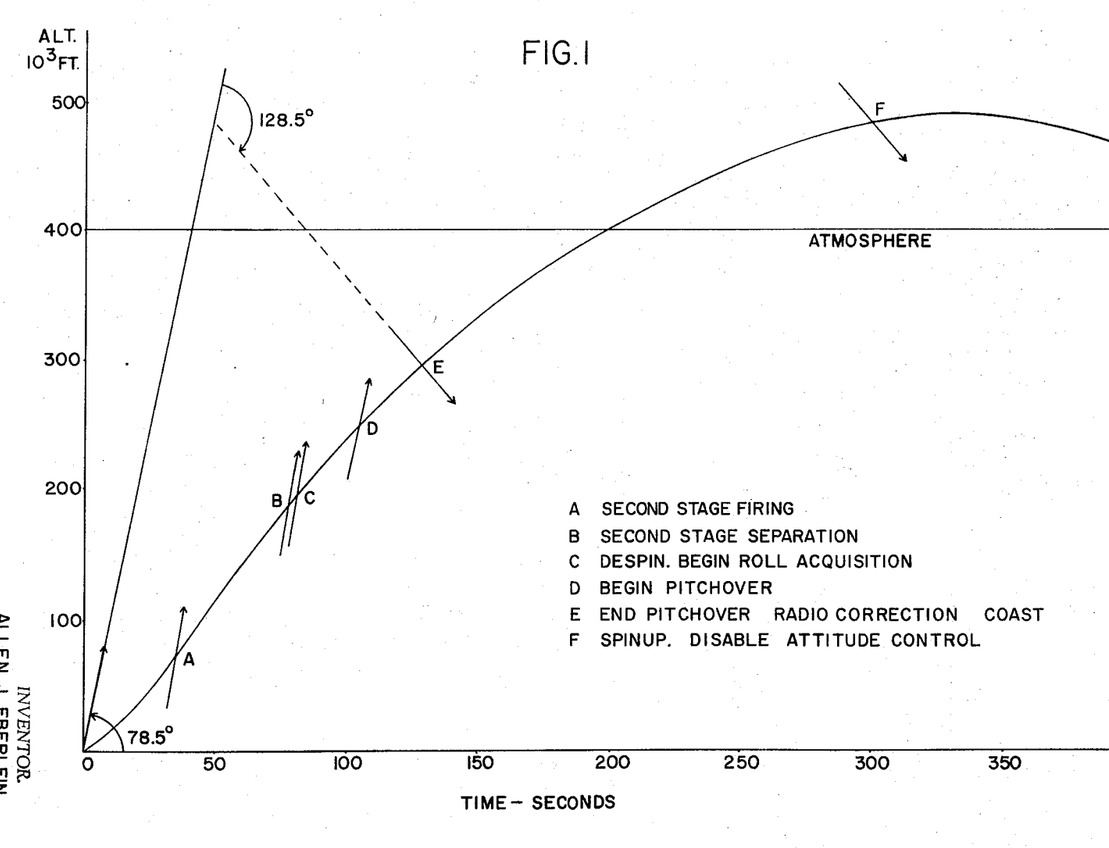
FIGURE 1 is a showing of the motion of a vehicle using the invention.

Consider FIGURE 1, which should not be confused with the flight path of the vehicle in space. This figure is a graph of the altitude of the velocity package plotted against time, and also shows the direction of the longitudinal axis at various points in time, for a representative test flight. The vehicle has an initial elevation angle of 78.5°; the tail fins on the first and second stage rocket motors maintain this orientation, and also cause the total vehicle to spin about its longitudinal axis. The first stage burns out and separates, and the second stage ignites at point A in FIGURE 1; it in turn burns out and separates at point B. By this time the velocity package has a spin rate of about three revolutions per second. At point C the despin device is triggered, and reduces the spin to less than 36° per second in the extremely brief interval of about .1 second. Also at point C the attitude controller begins to activate the jets so as to reduce the angular rate of the vehicle about the roll axis to zero, and to bring about a predetermined attitude of the vehicle about its longitudinal axis, so that a selected longitudinal plane in the vehicle becomes and remains parallel with the plane of the trajectory. The achieving of the desired roll attitude is referred to as roll acquisition and takes place between points C and D on FIGURE 1.

At point D the control unit brings about an angular displacement of the vehicle, through an angle of 128.5°, about an axis, perpendicular to the plane of the trajectory, which is defined as the pitch-over axis of the vehicle. This process is completed by the time the point E is reached, and from then on the velocity package coasts, in same attitude about its pitch, roll and yaw axes, unless radio signals are supplied to change that attitude so as to compensate for imperfections in the flight profile. At any time after point E such as point F, further jets may be fired to spin the velocity package up to 10 r.p.s. about its roll axis, and thereafter the control unit is jettisoned. The occurrence of point B is determined by the separation of the second stage from the velocity package, and points C, D, and E are determined by operation of a programmer forming a part of the control unit. The radio corrections which form no part of the present invention may be accomplished either before or after the pitch-over maneuver.

Figures 2, 3:
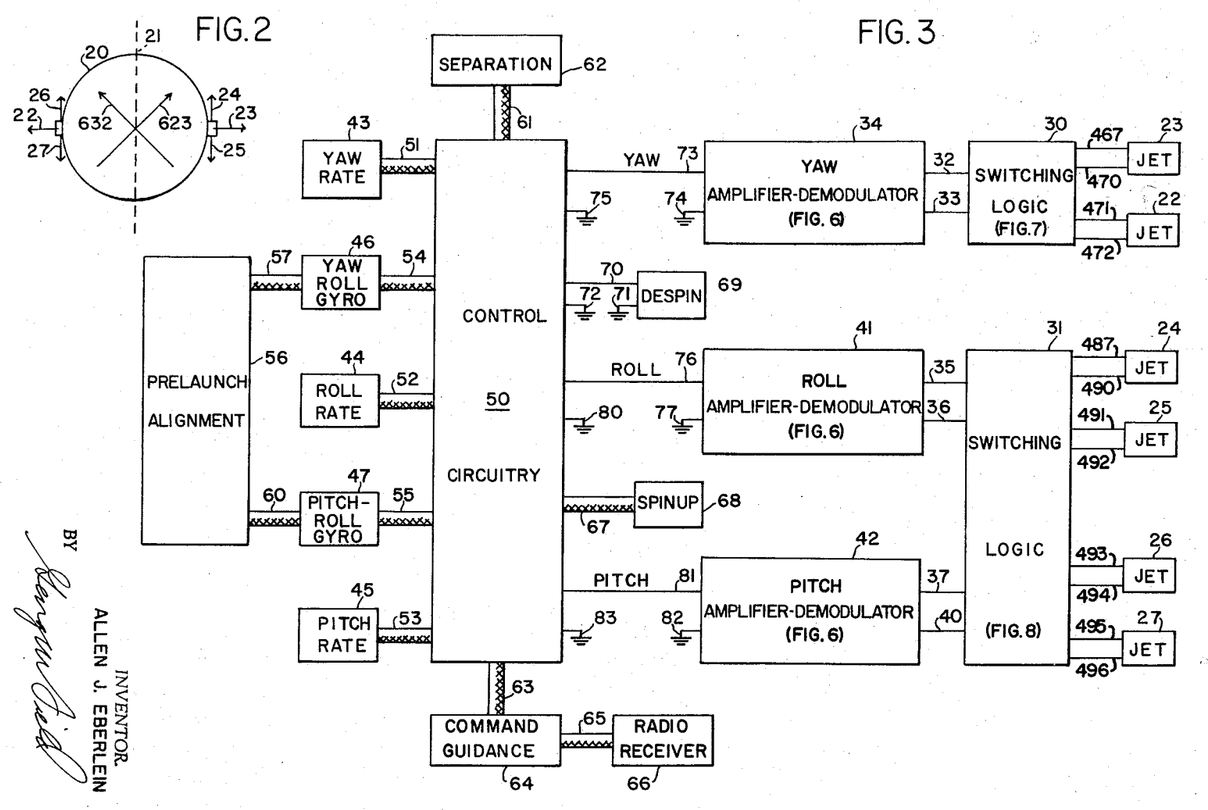
FIGURE 2 is a rear view of a vehicle showing the attitude control jets.
FIGURE 3 is a block diagram of a system embodying the invention.

FIGURE 2 is a schematic view looking at the velocity package, bearing the reference numeral 20, from the rear, and shows the jet arrangement; it is understood that the jets are located behind the center of gravity of the package so that they produce angular motion in the same direction to that in which they discharge. The longitudinal plane passing through the broken line 21 is the one which is made parallel with the plane of the trajectory during roll acquisition. A first pair of jets 22 and 23 act in opposite radial directions perpendicular to the plane to cause left and right yaw of the vehicle respectively, and a first pair of jets 24 and 25 and a second pair of jets 26 and 27 act tangentially in pairs to cause pitch and roll of the vehicle. Jets 24 and 26 fire together to cause the vehicle to nose up, jets 25 and 27 fire together to cause it to nose down. In the same way jets 24 and 27 fire together to cause it to roll clockwise to the right, and jets 25 and 26 fire together to cause it to roll counter-clockwise to the left. The roll axis is of course central and perpendicular to the paper.

Figures 4, 6:
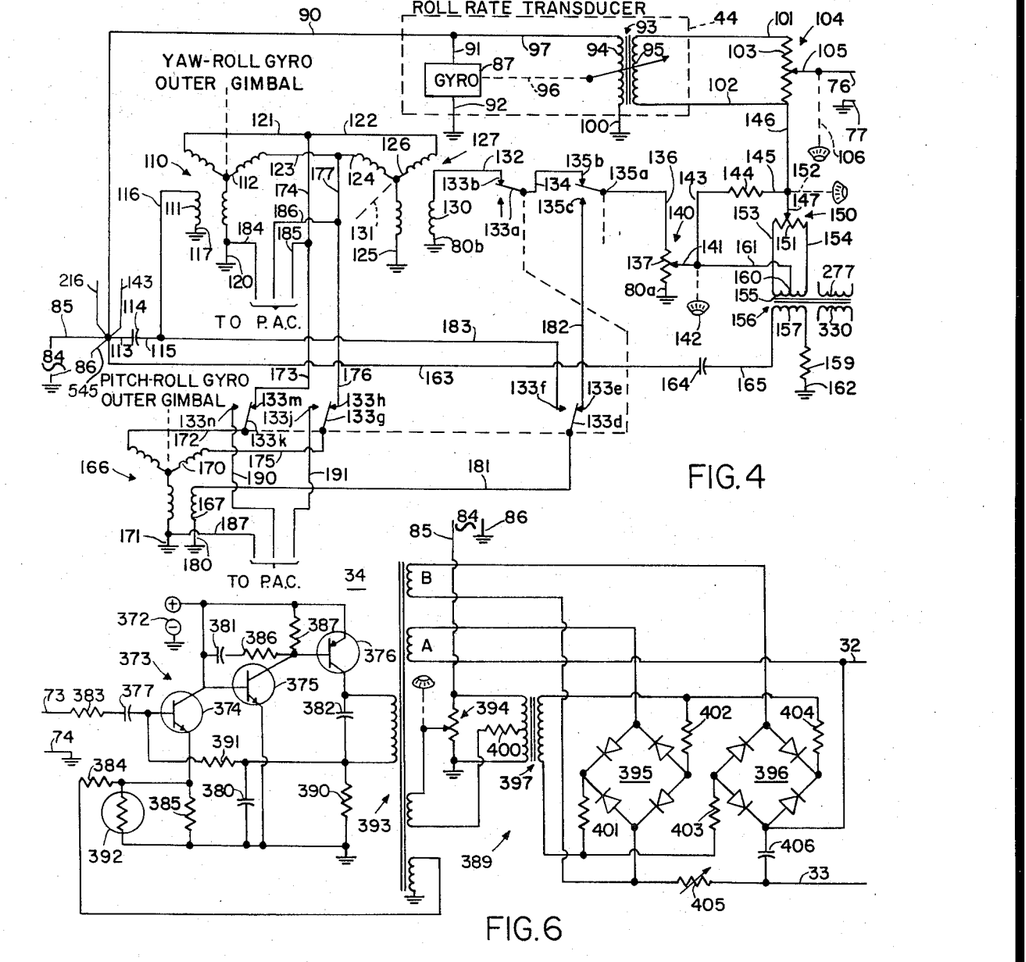
FIGURE 4 is a schematic diagram of the roll control portion of the system.
FIGURES 6, 7 and 8 are detailed circuit diagrams of components shown as blocks in FIGURE 3.

FIGURE 3 is a system block diagram. Jets 22 and 23 are shown as controlled from a switching logic 30 better illustrated in FIGURE 7, and jets 24-27 are shown as controlled from a switching logic 31 better illustrated in FIGURE 8. Logic 30 is shown as controlled through conductors 32 and 33 by the output of an amplifier-demodulator 34, and logic 31 is shown as controlled through conductors 35, 36, 37 and 40 by the outputs of amplifier-demodulators 41 and 42. FIGURE 6 shows details of amplifier-demodulator 34 and the other two may be similarly constructed.

The sensing elements of the control unit are shown to comprise a yaw rate transducer 43, a roll rate transducer 44, a pitch rate transducer 45, a yaw-roll displacement gyroscope 46, and a pitch-roll displacement gyroscope 47, which are shown as connected to the control circuitry 50 of the system through cables 51, 52, 53, 54 and 55 respectively. Gyroscopes 46 and 47 are also shown as connected to a pre-launch alignment control 56 through cables 57 and 60 respectively.

Inputs are also supplied to circuitry 50 through a cable 61 from separation switch means 62, through a cable 63 from command guidance translation means 64 energized through a cable 65 from a suitable radio receiver 66, and through a cable 67 from spin-up switch means 68.

The control circuitry 50 supplies an output to a despin device 69 through conductor 70 and ground connections 71 and 72, to amplifier-demodulator 34 through conductor 73 and ground connections 74 and 75, to amplifier-demodulator 41 through conductor 76 and ground connections 77 and 80, and to amplifier-demodulator 42 through conductor 81 and ground connections 82 and 83.

FIGURE 4 shows the input portion of the attitude controller roll channel to be energized from a source 84 of alternating voltage at conductors 85 and ground connection 86. The spin motor of gyroscope 87 in roll rate transducer 44 is energized from source 84 through conductors 85, 90 and 91 and ground connections 92 and 86. A variable output transformer 93 having a primary winding 94 and a secondary winding 95 is adjusted by gyroscope 87 through a mechanical connection 96: primary winding 94 is energized from source 84 through conductors 85, 90 and 97 and ground connections 100 and 86. The output of transformer 93 is supplied through conductors 101 and 102 to the winding 103 of a voltage divider 104 having a slider 105 adjustable by a manual knob 106. Slider 105 is connected to the input conductor 76 of amplifier-demodulator 41.

A synchro 110 forms a part of yaw-roll gyroscope 46 and comprises a single phase winding 111 and a three phase winding 112, the former being energized from source 84 through conductors 85 and 13, a phase shifting capacitor 114, and conductors 115 and 116 and through ground connections 86 and 17. Relative rotation between the outer gimbal and the frame in which it is mounted varies the voltages induced the three phase winding, which is connected through conductors 121 and 122, conductors 123 and 124, and ground connections 120 and 125 to the similar three phase winding 126 of a roll acquisition synchro 127 having a single phase winding 130. The relative positions of windings 126 and 130 may be adjusted by a mechanical connection 131, which when set may be locked by suitable means: this adjustment determines the plane through the longitudinal axis of the velocity package which will be brought into alignment with the trajectory plane beginning at point C in FIGURE 1.

The output of winding 130 is supplied through ground connections 80b and 80a and through conductor 132, normally closed relay contacts 133b and 133a, conductor 134, normally closed relay contacts 135b and 135a, and conductor 136 to the winding 137 of a voltage divider 140 having a slider 141 adjustable by a manual knob 142. The relays will be discussed in more detail in connection with FIGURE 9.

Return to FIGURE 4, slider 141 is connected through conductor 143, a resistor 144, and conductors 145 and 146 to one end of winding 103. Conductors 145 and 146 are connected to the slider 147 of a voltage divider 150 having a winding 151. Slider 147 is adjustable by a manual knob 152. Winding 151 is connected by conductors 153 and 154 to the ends of one secondary winding 155 of a quadrature compensation transformer 156 having a primary winding 157. Secondary winding 155 is center tapped at 160 and the center tap is connected by a conductor 161 to slider 141, so that a voltage determined in magnitude and phase by the position of slider 147 with respect to the center of winding 151 may be impressed across resistor 144. Primary winding 157 is energized from source 84 through ground connections 86 and 162 and resistor 159, and through conductors 85 and 163, phase shifting capacitor 164 and conductor 165. Elements 147 to 165 are provided to make it possible to neutralize any residual quadrature signal in the synchro system not corrected by capacitor 114.

Also shown in FIGURE 4 is a synchro 166 which forms a part of pitch-roll gyroscope 47 and comprises a single phase winding 167 and a three phase winding 170. Winding 170 is connected in parallel with winding 126 by ground connections 171 and 125, by conductor 172, normally closed relay contacts 133k and 133m, and conductors 173, 174 and 122, and by conductor 175, normally closed relay contacts 133g and 133h, and conductors 176, 177 and 124. One end of winding 167 is grounded at 180; the other is connected through a conductor 181 to movable relay contact 133d. Fixed relay contact 133e, normally closed, is connected through conductor 182 to fixed relay contact 135c, and fixed relay contact 133f is connected through conductors 183 and 115, capacitor 114 and conductors 113 and 85 to source 84.

The output from winding 112 is supplied to prelaunch alignment control 56 on conductors 184, 185 and 186, the former being grounded and the latter two being connected to conductors 174 and 177. The output from winding 170 may be supplied to prelaunch alignment control 56, when relay 133 is energized, through grounded conductor 187 and further conductors 190 and 191 connected to fixed relay contacts 133n and 133j respectively.

Figure 5:
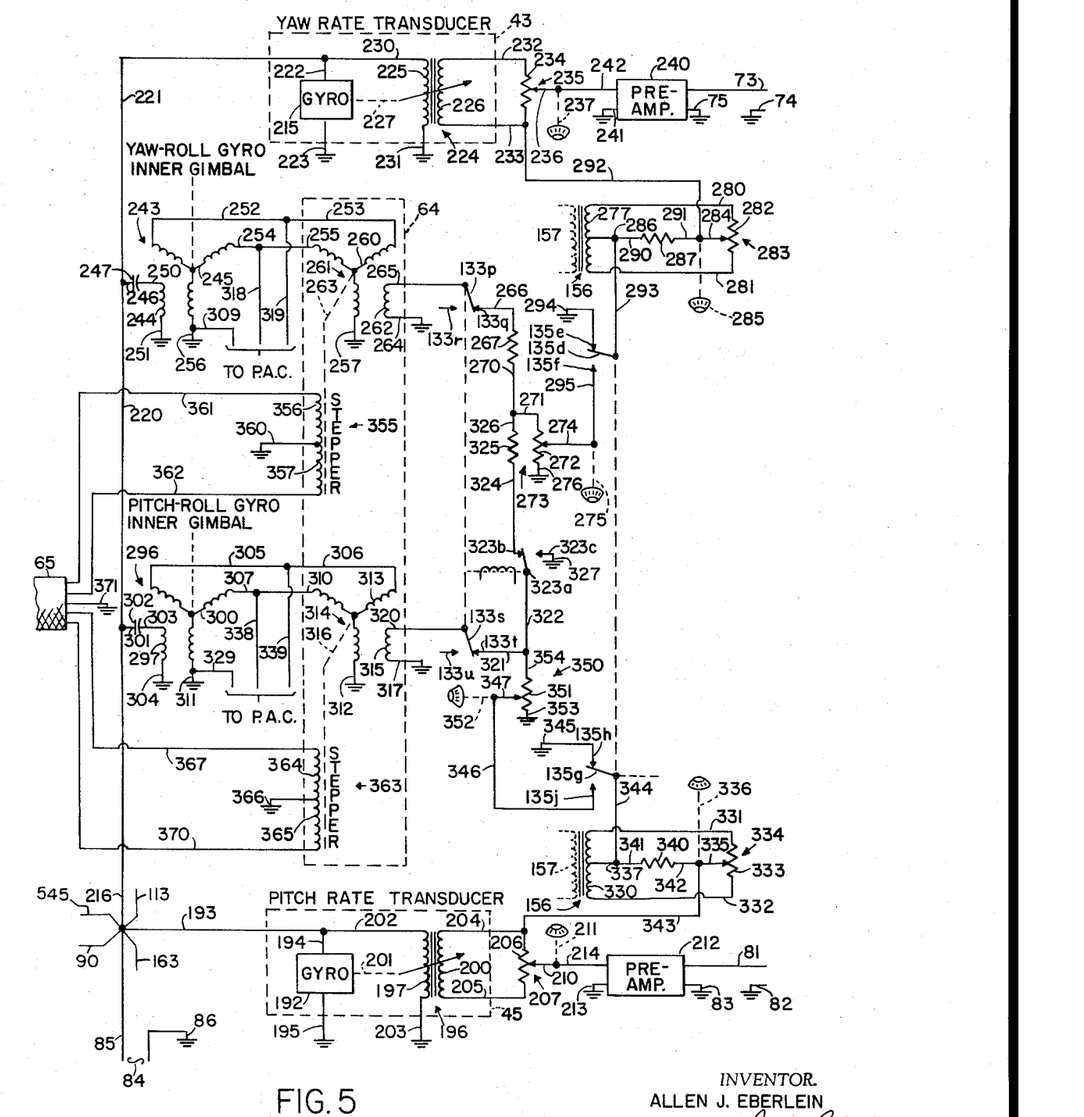
FIGURE 5 is a schematic diagram of the yaw and pitch control portion of the system.

FIGURE 5 shows the input portion of the attitude controller yaw and pitch channels to be also energized from source 84. The spin motor of gyroscope 192 in pitch rate transducer 45 is energized from source 84 through conductors 85, 193 and 194 and ground connections 195 and 86. A variable output transformer 196 having a primary winding 197 and a secondary winding 200 is adjusted by gyroscope 192 through a mechanical connection 201: primary winding 197 is energized from source 84 through conductors 85, 193 and 202 and ground connections 203 and 86. The output from transformer 196 is supplied through conductors 204 and 205 to the winding 206 of a voltage divider 207 having a slider 210 adjustable by a manual knob 211.

A preamplifier 212 is shown as having a pair of input connections, one grounded at 213 and the other connected by the conductor 214 to slider 210. The output of preamplifier 212 is connected to amplifier-modulator 42 through conductor 81 and ground connections 82 and 83.

The spin motor of gyroscope 215 in yaw rate transducer 43 is energized from source 84 through conductors 85, 216, 220, 221 and 222 and ground connections 223 and 86. A variable output transformer 224 having a primary winding 225 and a secondary winding 226 is adjusted by gyroscope 215 through a mechanical connection 227: primary winding 225 is energized from source 84 through conductors 85, 216, 220, 221 and 230 and ground connections 231 and 86. The output of transformer 224 is supplied through conductors 232 and 233 to the winding 234 of a voltage divider 235 having a slider 236 adjustable by a manual knob 237.

A preamplifier 240 is shown as having a pair of input connections, one grounded at 241 and the other connected by a conductor 242 to slider 236. The output of preamplifier 240 is connected to amplifier-demodulator 34 through conductor 73 and ground connections 74 and 75.

A synchro 243 forms a part of yaw-roll gyroscope 46 and comprises a single phase winding 244 and a three phase winding 245, the former being energized from source 84 through conductors 85, 216, 220 and 246, a phase shifting capacitor 247, and conductor 250 and through ground connections 86 and 251. Relative rotation between the inner and outer gimbals of the yaw-roll gyroscope varies the voltages induced in the three phase winding, which is connected through conductors 252 and 253, conductors 254 and 255, and ground connections 256 and 257 to the three phase winding 260 of a synchro 261 having a single phase winding 262. Conductors 116, 117, 120, 121, 123, 246, 251, 252, 254, and 256, make up cable 54 of FIGURE 3. The relative positions of windings 260 and 262 may be adjusted by a mechanical connection 263.

One end of winding 262 is grounded at 264. The other end is connected through conductor 265, normally closed relay contacts 133p and 133q, conductor 266, an isolation resistor 267, and conductors 270 and 271 to the winding 272 of a voltage divider 273 having a slider 274 actuable by a manual knob 275: the other end of winding 272 is grounded at 276.

Another secondary winding 277 of transformer 156 is connected by conductors 280 and 281 to the winding 282 of a voltage divider 283 having a slider 284 actuated by a manual knob 285. Winding 277 is center tapped at 286 and a resistor 287 is connected between tap 286 and slider 284 by conductors 290 and 291. Slider 284 is connected to the bottom of winding 234 by conductor 292. Center tap 286 is connected through conductor 293 and normally closed relay contacts 135d and 135e to a ground connection 294. Slider 274 is connected by a conductor 295 to relay contact 135f.

A synchro 296 forms a part of pitch-roll gyroscope 47 and comprises a single phase winding 297 and a three phase winding 300, the former being energized from source 84 through conductors 85, 216 and 301, a phase shifting capacitor 302, and conductor 303 and through ground connections 304 and 86. Relative rotation between the inner and outer gimbals of the pitch-roll gyroscope varies the voltages induced in the three phase winding, which is connected by conductors 305 and 306, conductors 307 and 310, and ground connections 311 and 312 to the three phase winding 313 of a synchro 314 having a single phase winding 315. Conductors 171, 172, 175, 180, 181, 301, 304, 305, 307, and 311 make up cable 55 of FIGURE 3. The relative positions of windings 313 and 315 may be adjusted by a mechanical connection 316.

One end of winding 315 is grounded at 317. The other end is connected through conductor 320, normally closed relay contacts 133s and 133t, conductors 321 and 322, normally closed relay contacts 323a and 323b, conductor 324, an isolation resistor 325, and conductors 326 and 271 to the winding 272 of voltage divider 273. Relay contact 323c is grounded at 327.

Conductors 253, 255, 257, 264, 265, 306, 310, 312, 317, and 320 make up cable 63 of FIGURE 3.

Another secondary winding 330 of transformer 156 is connected by conductors 331 and 332 to the winding 333 of a voltage divider 334 having a slider 335 actuated by a manual knob 336. Winding 330 is center tapped at 337 and a resistor 340 is connected between tap 337 and slider 335 by conductors 341 and 342. Slider 335 is connected to the top of winding 206 by conductor 343. Center tap 337 is connected through conductor 344 and normally closed relay contacts 135g and 135h to a ground connection 345.

Relay contact 135j is connected through conductor 346 to the slider 347 of a voltage divider 350 having a winding 351: slider 347 is adjustable by a manual knob 352. One end of winding 351 is grounded at 353: the other end is connected by conductor 354 to conductors 321 and 322.

The output from winding 245 is supplied to prelaunch alignment control 56 on conductors 309, 318 and 319, the former being grounded and the latter two being connected to conductors 254 and 252. Conductors 184, 185, 186, 309, 318, and 319 make up cable 57 of FIGURE 3.

The output from winding 300 is supplied to pre-launch alignment control 56 on conductors 329, 338, and 339, the former being grounded and the latter two being connected to conductors 307 and 305. Conductors 187, 190, 191, 329, 338, and 339 make up cable 60 of FIGURE 3.

Mechanical connection 263 is operated by a stepper mechanism 355 comprising a pair of solenoids 356 and 357 with a common ground connection 360 and independent input connections 361 and 362. Whenever a pulse of electrical energy is supplied between conductor 361 and ground, forward rotation of synchro 261 through one-quarter degree is accomplished, while each pulse of energy between conductor 362 and ground causes equal backward rotation of synchro 261.

Mechanical connection 316 is operated by a stepper mechanism 363 comprising a pair of solenoids 364 and 365 with a common ground connection 366 and independent input conductors 367 and 370. Whenever a pulse of electrical energy is supplied between conductor 367 and ground, forward rotation of synchro 314 through one-quarter degree is accomplished, while each pulse of energy between conductor 370 and ground causes equal backward rotation of synchro 314.

Conductors 253, 255, 257, 264, 265, 306, 310, 312, 317, and 320 are comprised in cable 63 of FIGURE 3, conductors 361, 362, 367, and 370 and a suitable ground conductor 371 are comprised in cable 65 of FIGURE 3, and synchros 261 and 314 and their attending stepping mechanisms make up command guidance unit 64.

Amplifier-demodulator 34 is shown in detail in FIGURE 6 for completeness, although it is of generally known design. It is energized from source 84 of alternating voltage and from a source 372 of direct voltage. The amplifier portion 373 is shown to comprise transistors 374, 375 and 376, capacitors 377, 380, 381 and 382, resistors 383, 384, 385, 386, 387, 390 and 391, a sensistor 392, and a transformer 393. The demodulator portion 389 is shown to comprise a voltage divider 394, a pair of rectifier bridges 395 and 396, a transformer 397, fixed resistors 400, 401, 402, 403, and 404, a variable resistor 405, and a filter capacitor 406. The arrangement is such that when an alternating voltage is impressed between conductor 73 and ground 74 there results a uni-directional voltage between conductors 32 and 33 which varies with the amplitude of the impressed voltage, and which reverses in polarity with reversal in the phase of the impressed voltage.

Figure 7:
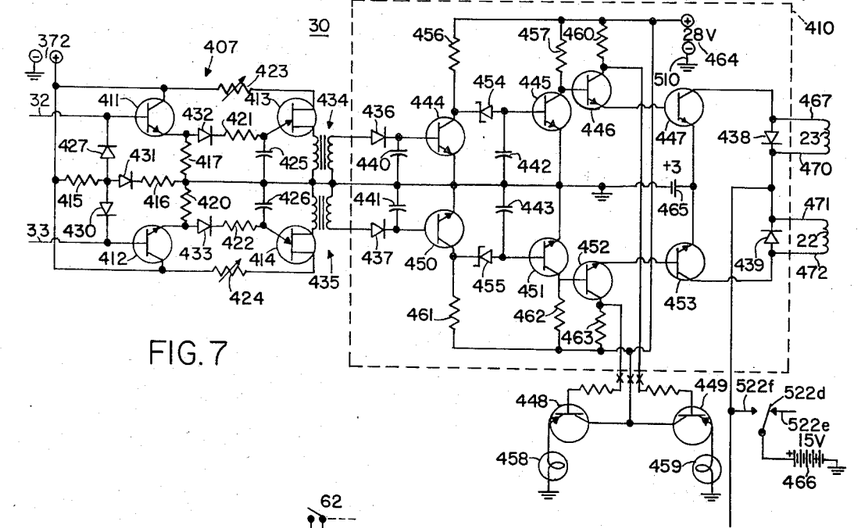

Switching logic 30 is shown in FIGURE 7 to comprise a controlled oscillator 407 and an electronic switch 410, which are also believed to be of generally known design. Oscillator 407 is energized from D.C. source 372, and is shown to comprise transistors 411, 412, 413, and 414, fixed resistors 415, 416, 417, 420, 421 and 422, variable resistors 423 and 424, capacitors 425 and 426, rectifiers 427, 430, 431, 432, and 433, and transformers 434 and 435. The arrangement is such that if a voltage of a first polarity and of greater than a predetermined magnitude is impressed on conductors 32 and 33 transformer 434 supplies an output, while if the impressed voltages of the opposite polarity, transformer 435 supplies the output.

Switch 410 comprises rectifiers 436, 437, 438 and 439, capacitors 440, 441, 442, and 443, transistors 444, 445, 446, 447, 450, 451, 452, and 453, zener diodes 454 and 455, fixed resistors 456, 457, 460, 461, 462 and 463, a 28-volt source 464, and a three volt source 465, both positive with respect to ground. Its actuating energy is supplied by a 15 volt source 466 under the control of normally open relay contacts 522d and 522f. The solenoid of jet 23 is connected across rectifier 438 by conductors 467 and 470, and the solenoid of jet 22 is connected across rectifier 439 by conductors 471 and 472. The arrangement is such that if oscillations are supplied by transformer 434, jet 23 is actuated, while if oscillations are supplied by transformer 435, jet 22 is actuated. At a remote point reached through an umbilical collection, a pair of transistors 448 and 449 energize appropriate pilot lights 458 and 459 to permit checking the operation of the system, even if relay contacts 522d and 522f are not in an engagement.

Figure 8:
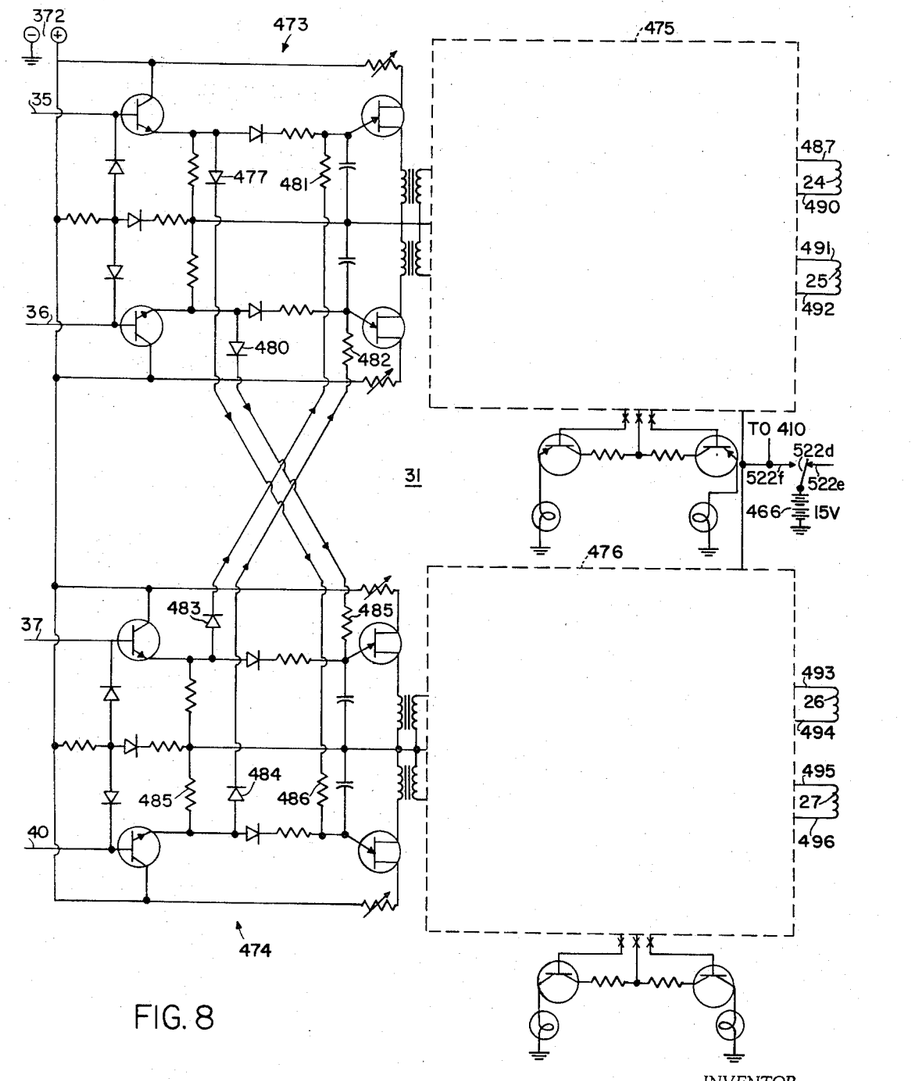

Switching logic 31 is shown in FIGURE 8 to comprise a pair of controlled oscillators 473 and 474 and a pair of electronic switches 475 and 476 which may be identical in structure to switch 410. Oscillator 473 is identical with oscillator 407 in FIGURE 7, except that rectifiers 477 and 480 and resistors 481 and 482 are added, and oscillator 474 is also identical with oscillator 407 except that rectifiers 483 and 484 and resistors 485 and 486 are added. Rectifier 477 and resistor 486 are connected in series, as are rectifier 480 and resistor 485, rectifier, 483 and resistor 481, and rectifier 484 and resistor 482.

The arrangement is now such that if a voltage of a first polarity is impressed across conductors 35 and 36, the upper transformer of oscillator 473 energizes switch 475 and the lower transformer of oscillator 474 energizes switch 476: if the impressed voltage reverses in polarity, the lower transformer of oscillator 473 energizes switch 475 and the upper transformer of oscillator 474 energizes switch 476. On the other hand if the voltage of a first polarity impressed between conductors 37 and 40 the upper transformers of both oscillators energize the switches, while if the impressed voltage reverses in polarity the lower transformers of both oscillators energize the switches.

The solenoids of jets 24 and 25 are energized from switch 475 through conductors 487 and 490 and conductors 491 and 492, and the solenoids of jets 26 and 27 are energized from switch 476 through conductors 493 and 494 and conductors 495 and 496, all respectively.

Figure 9:
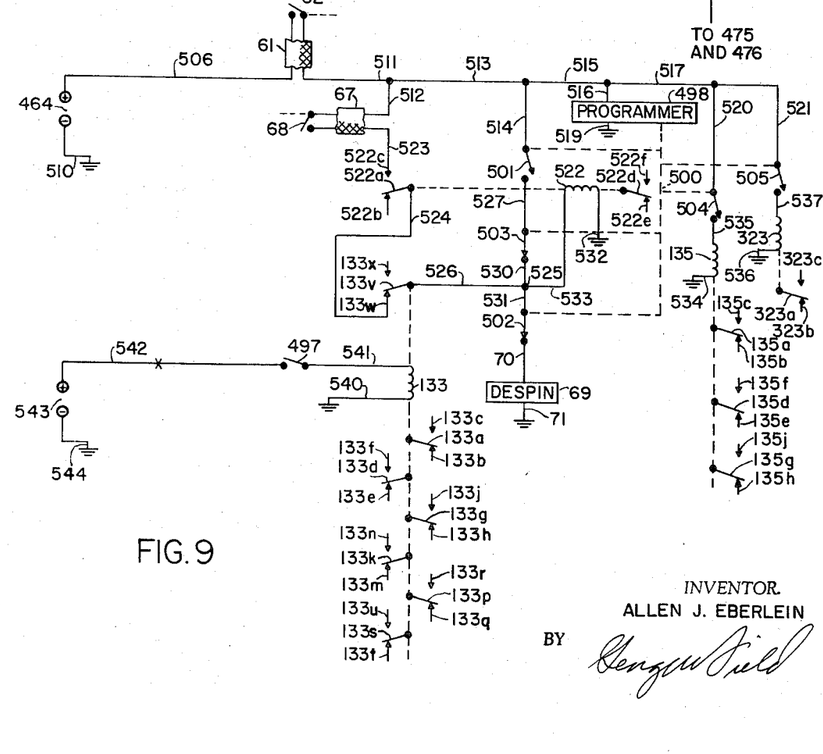
FIGURE 9 is a schematic diagram showing relay circuitry used in the invention.

The relay circuitry for the control unit is shown in FIGURE 9 to comprise 28-volt source 464, separation switch 62, spin up switch 68, despin device 69, and relays 133, 135, 323 and 522 already mentioned, together with a switch 497, a programmer 498 which acts through means indicated by the broken line 500, representing either a mechanical or electrical interconnection, to control the operation of a plurality of switches 501, 502, 503, 504 and 505. Switches 502 and 503 are closed in the initial position of programmer 498, while the others are open.

One side of switch 62 is connected to the positive terminal of source 464 through conductor 506: the negative terminal of source 464 is grounded at 510. The other side of switch 62 is connected as follows: to one side of switch 68 through conductors 511 and 512; to one side of switch 501 through conductors 511, 513 and 514; to programmer 498 through conductors 511, 513 515 and 516; to one side of switch 504 through conductors 511, 513, 515, 517 and 520; and to one side of switch 505 through conductors 511, 513, 515, 517, and 521. Programmer 498 is grounded at 519.

The other side of switch 68 is connected to fixed relay contact 522c by conductor 523. Movable relay contact 522a is connected to fixed relay contact 133w by conductor 524. Movable relay contact 133v is connected to a junction point 525 by conductor 526. The other side of switch 501 is connected through conductor 527 to one side of switch 503: the other side of switch 503 is connected to junction point 525 by a conductor 530. Junction point 525 is connected through conductor 531 to one side of switch 502; the other side of switch 502 is connected through conductor 70 to despin device 69 which is grounded at 71. One terminal of relay winding 522 is grounded at 532: the other terminal is connected to junction point 525 by conductor 533.

One terminal of relay winding 135 is grounded at 534. The other terminal is connected through conductor 535 to switch 504. One terminal of relay winding 323 is grounded at 536: the other terminal is connected through conductor 537 to switch 505. One terminal of relay winding 133 is grounded at 540. The other terminal is connected through conductor 541 to one side of switch 497, and the other side of switch 497 is connected through conductor 542 to the positive terminal of a source 543 of voltage independent of source 464, the other terminal of source 543 being grounded at 544. Source 464 is a part of the velocity package, but source 543 is located on the ground and conductor 542 is opened at X by an umbilical connection before the flight is begun.

The various contacts of relays 133, 135, 323 and 522 have been placed in several figures of the drawings so as to simplify an explanation of the system as a whole: for completeness they are shown in FIGURE 9 in association with their several windings.

Figures 10, 11:
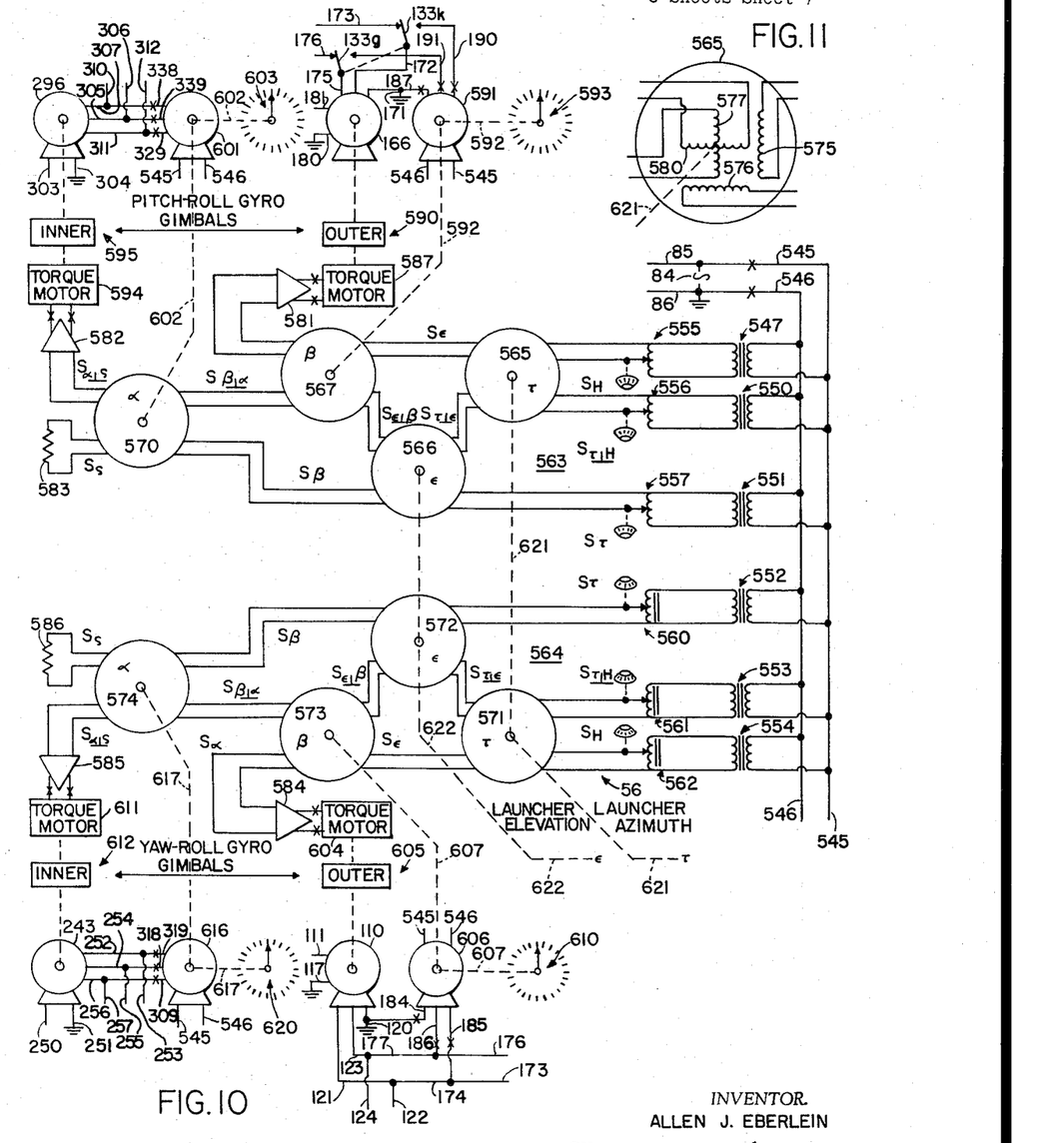
FIGURE 10 is a schematic showing of a pre-launch alignment control used in practicing the invention.
FIGURE 11 shows a detail of FIGURE 10.

FIGURE 10 shows prelaunch alignment control 56 and its connections to gyroscopes 46 and 47. It is understood that this apparatus as a whole remains on the ground and is connected to the attitude control system through an umbilical connection which is opened at points X before the flight has begun. Thus, source 84 is connected through a pair of conductors 545 and 546 to the primary windings of a plurality of oscillation transformers 547, 550, 551, 552, 553, and 554, and these in turn energize a like plurality of precision autotransformers 555, 556, 557, 560, 561 and 562, each adjustable by an accurately calibrated dial.

The apparatus comprises a first resolver chain 563, associated with the pitch-roll gyroscope 47 in the attitude controller, and energized from autotransformers 555, 556, and 557, and a second resolver chain 564, associated with yaw-roll gyroscope 46 and energized from autotransformers 560, 561 and 562. The first resolver chain includes resolvers 565, 566, 567 and 570, and the second resolver chain includes resolvers 571, 572, 573 and 574. All of the resolvers are alike, and resolver 565 is shown in FIGURE 11 to comprise a first pair of orthogonally disposed windings 575 and 576 and a second pair of orthogonally disposed windings 577 and 580. One pair of windings is arranged for unlimited rotation with respect to the other, so that if one pair is energized electrically the voltages induced in the other pair vary with the angle of rotation, as is conventional in these devices. Either pair of windings may be designed as the input pair, whereupon the other pair becomes the output pair.

The input windings of resolver 565 are energized from autotransformers 555 and 556. The input windings of resolver 566 are energized from autotransformer 557 and one output winding of resolver 565. The input windings of resolver 567 are energized from the other output winding of resolver 565 and from one output winding of resolver 566. The input windings of resolver 570 are energized from the other output winding of resolver 566 and from one output winding of resolver 567. The other output winding of resolver 567 energizes an amplifier 581, and one output winding of resolver 570 energizes an amplifier 582: the other output winding of resolver 570 is connected to a termination impedance 583.

The input windings of resolver 571 are energized from autotransformers 561 and 562. The input windings of resolver 572 are energized from autotransformer 560 and one output winding of resolver 571. The input windings of resolver 573 are energized from the other output winding of resolver 571 and from one output winding of resolver 572. The input windings of resolver 574 are energized from the other output winding of resolver 572 and from one output winding of resolver 573. The other output winding of resolver 573 energizes an amplifier 584, and one output winding of resolver 574 energizes an amplifier 585: the other output winding of resolver 574 is connected to a termination impedance 586.

Amplifier 581 energizes a torque motor 587 effective to precess pitch roll gyroscope 47 about its outer gimbal axis, and this rotation is communicated to synchro 166, as shown at 590. When relay 133 is energized, alternating voltage is supplied to synchro 166 between conductor 181 and ground connection 180, as previously described, and an output is supplied on conductors 187, 190 and 191 to the three phase winding of a synchro 591 having a single phase winding energized from conductors 545 and 546. The shaft 592 of synchro 591 is accordingly rotated until the windings are positioned like those in synchro 166, and at the same time the shaft rotates the movable windings of resolver 567 and operates an indicator 593 on which the angular position of the resolver may be seen.

Amplifier 582 energizes a torque motor 594 effective to precess pitch-roll gyroscope 47 about its inner gimbal axis, and this rotation is communicated to synchro 296, as shown at 595. Alternating voltage is supplied to synchro 296 between conductor 303 and ground connection 304, as previously described, and an output is supplied on conductors 329, 338 and 339 to the three phase winding of a synchro 601 having a single phase winding energized from conductors 545 and 546. The shaft 602 of synchro 601 is accordingly rotated until the windings are positioned like those in synchro 296, and at the same time the shaft rotates the movable windings of resolver 570 and operates an indicator 603 on which the angular position of the resolver may be read.

Amplifier 584 energizes a torque motor 604 effective to precess the yaw-roll gyroscope 46 about its outer gimbal axis, and this rotation is communicated to synchro 110, as shown at 605. Alternating voltage is supplied to synchro 110 between conductor 111 and ground connection 117, as previously described, and an output is supplied on conductors 184, 185 and 186 to the three phase winding of a synchro 606 having a single phase winding energized from conductors 545 and 546. The shaft 607 of synchro 606 is accordingly rotated until the windings are positioned like those in synchro 110, and at the same time the shaft rotates the movable windings of resolver 573 and operates an indicator 610 on which the angular position of the resolver may be read.

Amplifier 585 energizes a torque motor 611 effective to precess yaw-roll gyroscope 46 about its inner gimbal axis, and this rotation is communicated to synchro 243, as shown at 612. Alternating voltage is supplied to synchro 243 between conductor 250 and ground connection 251, as previously described, and an output is supplied on conductors 309, 318, and 319 to the three phase winding of a synchro 616 having a single phase winding energized from conductors 545 and 546. The shaft 617 of synchro 616 is accordingly rotated until the windings are positioned like those in synchro 243, and at the same time the shaft rotates the movable windings of resolver 574 and operates an indicator 620 on which the angular position of the resolver may be read.

Figure 12:
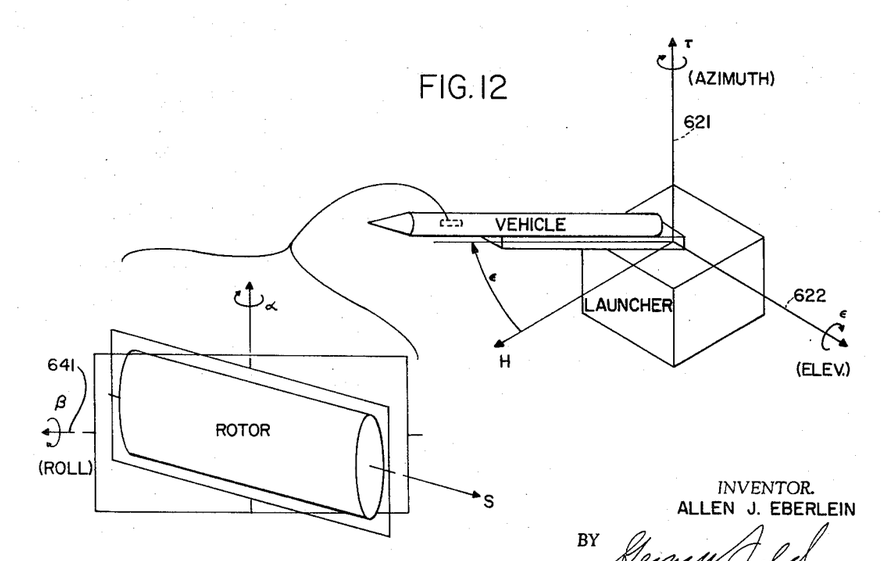
FIGURE 12 is a sketch identifying certain angles and showing certain common axes.

Resolvers 565 and 571 are arranged for rotation by a common shaft 621, and resolvers 566 and 572 are arranged for rotation by a common shaft 622. All four of these resolvers are located at the launcher, which is shown in FIGURE 12 to be rotatable in azimuth about a vertical axis, shared by the launcher frame and the earth frame, through an angle defined by $\tau$, and to be rotated in elevation about a horizontal axis, shared by the vehicle frame and the launcher frame, through an angle defined by $\epsilon$. Each gyroscope is mounted in the vehicle for rotation about an axis shared with the vehicle frame, through an angle defined by $\beta$, only one gyroscope being illustrated in FIGURE 12, and the inner gimbal is mounted for rotation about an axis shared with the outer gimbal, through an angle defined by $\alpha$. Shaft 621 actuates resolvers 565 and 571 of FIGURE 10 in accordance with change in the angle $\tau$, and shaft 622 actuates resolvers 566 and 572 in accordance with any change in the angle $\epsilon$.

Figure 13:
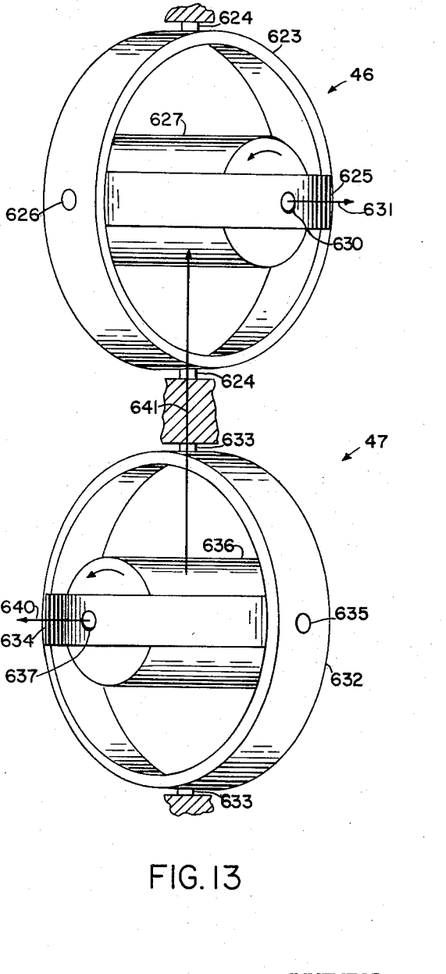
FIGURES 13 and 14 show a pair of gyroscopes according to the invention at two different instants in its use.

FIGURE 13 shows the attitude gyroscopes in their desired control orientation after pitch-over has been completed, that is, at point E on FIGURE 1. The yaw-roll gyroscope 46 is shown to comprise an outer gimbal ring 623 pivoted to the frame of the vehicle at 624, 624 for rotation about the roll axis, an inner gimbal ring 625 pivoted in the outer gimbal ring at 626 for rotation about an axis perpendicular to the roll axis, and a rotor 627 pivoted in the inner gimbal ring at 730 for high speed rotation about a spin axis 631. The pitch-roll gyroscope 47 is shown to comprise an outer gimbal ring 632 pivoted to the frame of the vehicle at 633, 633 for rotation also about the roll axis, an inner gimbal ring 634 pivoted in the outer gimbal ring at 635 for rotation about an axis perpendicular to the roll axis, and a rotor 636 pivoted in the inner gimbal ring at 637 for high speed rotation about a spin axis 640. The roll axis is indicated by the line 641: the plane 21 of FIGURE 2 contains line 641 of FIGURE 13 and is perpendicular to the paper. Axes 631 and 641 define a first plane and axes 640 and 641 define a second plane perpendicular to the first plane. In these respective planes the axes 631 and 640 are both perpendicular to 641.

A number of simplifications have been made in preparing FIGURE 13. In the first place the various synchros, torque motors, slip rings, and brushes have been omitted, as well as the caging mechanism since these elements are conventional. In the second place no attempt has been made to illustrate the high quality low friction bearings which are indispensable in the various gimbals. While in theory gyroscopic rigidity will hold the spin axis 631 and 640 immovable in space while the vehicle rotates about roll axis 641, in practice the finest bearings and the most perfect slip rings are not wholly friction-free, and this is greatly exaggerated during the launch since the accelerations involved more than treble the transverse forces, particularly on the outer gimbal bearings, the thrust being essentially parallel to the roll axis. Thus, as the vehicle spins a small torque is continuously applied about the outer gimbal axes, and this results in precessive drift of the spin axes about the inner gimbal axes. The average value of this drift can be determined experimentally and compensated for, but the range of drift values which may occur with a number of nominally identical gyroscopes is considerable and results in significant uncertainty when the gyroscopes are being used for precise studies. However, if the system is arranged so that after pitch-over the spin axes are nominally in mutually perpendicular planes, as shown, the effect of any preceding spin drift becomes nothing more than slight angular displacements of the spin axes in these planes from the nominal positions perpendicular to the roll axis, and such displacements have minimum effect on the outputs of the gyroscopes which are actually used. The importance of the orthogonal relationship of the spin axes after pitch-over is now evident.

Figure 14:
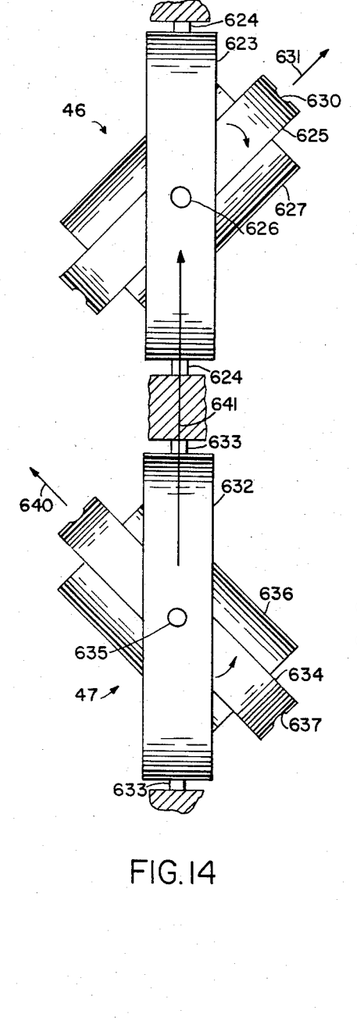

Not only has spin drift been effective before the orientation shown in FIGURE 13 is reached, but a pitch-over from an initial attitude has also been accomplished. FIGURE 14 shows the initial orientation of the gyroscopes which will result in the desired orientation after a pitch-over of 90°, neglecting spin drift. The plane of the inner and outer gimbal axes 624 and 626 is common with the plane of the inner and outer gimbal axes 633 and 635: axes 631 and 640 are in a plane which is perpendicular thereto, and are mutually perpendicular. The direction of the roll axis is that shown at D in FIGURE 1, and the plane through line 641 perpendicular to the paper is again 21 of FIGURE 2 and coincides with the common plane identified above. Pitch-over takes places about an axis lying in the paper and perpendicular to axis 641, in a direction to lower the top of the paper with respect to the bottom in FIGURE 14. A 90° pitch-over now causes the outer gimbal rings 623 and 632 to rotate through 45° about roll axis 641 in opposite directions, while causing the inner gimbal rings 625 and 634 to rotate through 45° in opposite directions within the outer gimbals.

The orientation shown in FIGURE 14 is the one automatically produced when the gyroscopes are caged, and results in null positions of synchros 110, 166, 243 and 296. If the pitch-over angle is different from 90°, as is usually the case, a correction for this difference must be made in the initial orientation, with the result that the planes defined by the gimbal axes of the two gyroscopes are not in coincidence but make some dihedral angle which can be predetermined for any desired pitch-over angle by appropriate calculations: the spin axes likewise cease to lie in a single plane.

Spin drift compensation also requires the initial orientation to be different from that shown in FIGURE 14, and the dihedral angle correction required for this purpose may also be calculated from the flight profile and added to the correction for pitch-over angle.

All of the components shown in FIGURES 4–9 inclusive except the remote indicator lamps and transistors such as 448 and 458 are mounted on two sides of a circular base plate intended to be separably installed as the rearmost component of the velocity package, extending transversely of the vehicle perpendicular to the roll axis thereof and having a certain range of angular adjustment about that axis. When so mounted, the outer gimbal axes of the two attitude gyroscopes are aligned with the roll axis of the package, and when caged the gyro spin axes are in the orientation shown in FIGURE 14. The only remaining settings are those for roll acquisition synchro 127, for autotransformers 555–557 and 560–562, and for synchros 261 and 314. The data needed for making these settings are supplied in the form of quantities computed from the desired flight parameters and the predetermined flight profile.

The quantity $S_r$ to which autotransformer 557 must be set is the direction cosine of the corrected initial position of the spin vector of the pitch-roll gyroscope projected on the vertical axis of the launcher, and the quantity $S_r$ to which autotransformer 560 must be set is the similar direction cosine of the spin vector of the yaw-roll gyroscope. The quantity $S_H$ to which autotransformer 555 must be set is the direction cosine of the spin vector of the pitch-roll gyroscope projected on the horizontal axis extending north, and the quantity $S_H$ to which autotransformer 562 must be set is the similar direction cosine of the spin vector of the yaw-roll gyroscope. The quantity $S_{r/H}$ to which autotransformer 556 must be set is the direction cosine of the spin vector of the pitch-roll gyroscope along an axis perpendicular to the other two, and the quantity $S_{r/H}$ to which autotransformer 561 must be set is the similar direction cosine of the spin vector of the yaw-roll gyroscope. When 555, 556, and 557 are set there is only one pair of values for $\alpha$ and $\beta$ for the pitch-roll gyroscope at which both of amplifiers 581 and 582 have zero inputs for any particular values of $\tau$ and $\epsilon$, and the values of $\alpha$ and $\beta$ are changed with those of $\tau$ and $\epsilon$ so that launcher adjustment in azimuth or elevation has no effect on the direction in earth coordinates of a spin axis resulting from the autotransformer settings. The same is true of course in connection with the yaw-roll gyroscope.

Knowing the values of $S_r$, and $S_{r/H}$, it is also possible to determine the dihedral angle between the plane of the gimbal axes of the pitch-roll gyroscope and the plane of the gimbal axes of the yaw-roll gyroscope, and roll acquisition synchro 127 is set to a position determined by one-half that angle. This is done after the attitude controller is adjusted angularly around the roll axis so that plane 21 of FIGURE 2 is accurately in the local vertical. Initial proper adjustments of voltage dividers 104, 140, 150, 207, 235, 273, 283, 334, 350, 394, 423 and 424 have also been made in appropriate bench checkout procedures.

A flight is conducted as follows. The first booster stage is placed on the launcher rail, presently horizontal, and the second booster stage is coupled to it. The velocity package is assembled separately, including the attitude controller with the roll acquisition synchro properly adjusted, and then is assembled to the stages already on the launcher. A heat shield is adjusted around the attitude control and fastened to the second stage, care being taken to insure that separation switch 62 is thereby opened. Next a precision leveling fixture is inserted through access holes in the heat shield and the attitude control is rotated about the roll axis by the small amount necessary to bring the roll acquisition plane accurately vertical. The access holes are now closed and the umbilical connection is made to the prelaunch attitude control.

Shaft 621 has been connected to synchros 565 and 571 so that they both give null signals when the launcher's azimuth is directly north, and shaft 622 has been connected to synchros 566 and 572 so that they both give null signals when the launcher is horizontal. The gyroscopes in the attitude controller are caged, the launcher is raised so that the angle $\epsilon$ becomes 90° less than the reentry angle, alternating and direct voltages are supplied as indicated in the drawing, and switch 497 is closed. Autotransformers 555, 556 and 557 are set to values corresponding to the direction cosines of the spin vector of gyroscope 46, and synchros 567 and 570, free from their shafts, are set to such positions that amplifiers 581 and 582 simultaneously give zero outputs. The synchros are then coupled to shafts 592 and 602, and indicators 593 and 603 are set to give zero readings. Similarly autotransformers 560, 561 and 562 are set to values corresponding to the direction cosines of the spin vector of gyroscope 47, and synchros 573 and 574, free from their shafts, are set to such positions that amplifiers 584 and 585 simultaneously give zero outputs. The synchros are now coupled to shafts 607 and 617, and indicators 610 and 620 are set to give zero readings.

The gyroscopes are now uncaged and the autotransformers are reset to previously computed values which correct for spin drift in the proposed flight and for deviation of the actual pitch over angle from 90°. The resolver chains now supply voltages to amplifiers 581, 582, 584 and 585, and the spin vectors in the gyroscopes are torqued to the desired new positions. Subsequent elevation of the launcher to firing position or change in its azimuth to accommodate change in wind direction do not affect the orientation of the gyroscopes in the earth referenced frame. Moreover, if there is delay in the countdown for any reason, the apparatus in FIGURE 10 continuously corrects any tendency for the gyroscopes to drift and prevents change in the reference system with the rotation of the earth.

Just before the vehicle takes off switch 497 is opened: if this should be overlooked the separation of the umbilical connection automatically takes care of this.

The flight proceeds as follows. The first booster stage lifts the vehicle off the launcher and accelerates it until burn-out, when the first stage separates and the second stage ignites, accelerating the vehicle to its maximum upward velocity and giving it an axial spin. After burn-out the second booster stage separates, taking with it the heat shield, and switch 62, FIGURE 9, closes, completing a circuit from source 464 through conductor 506, switch 62, conductors 511, 513, 515, and 516, programmer 498, and ground connections 519 and 510 back to source 464. At this time switch 68 is open because the vehicle is spinning.

After a predetermined interval on the order of two seconds programmer 498 closes switch 501, energizing junction point 525 from conductor 513 through conductor 514, switch 501, conductor 527, switch 503, and conductor 530. Despin device 69 is energized from junction point 525 through conductor 531, switch 502, and conductor 70, and through ground connections 71 and 510, and relay 522 is energized through conductor 533 and ground connections 532 and 510. Operation of device 69 reduces the spin of the vehicle to a value which permits switch 68 to close, and a holding circuit is now completed from conductor 511 through conductor 512, switch 68, conductor 523, relay contacts 522c and 522a, conductor 524, relay contacts 133w and 133v, and conductor 526 to junction point 525.

Relay 522 is also effective in FIGURES 7 and 8 to supply power for the circuits energizing the jet solenoids from source 466, through contacts 522d and 522f.

The input circuit for amplifier-demodulator 14 may be traced in FIGURE 4 from conductor 76 through slider 105, the portion of winding 103 below the slider, conductors 146 and 145, resistor 144, conductor 143, slider 141, the portion of winding 137 below the slider, to ground connections 80a and 77. The roll control signal now comprises the sum of a roll rate portion across winding 103, a quadrature balance portion across resistor 144, and a roll attitude portion across winding 137, supplied through conductor 136, relay contacts 135a and 135b, conductor 134, relay contacts 133a and 133b and conductor 132 from synchro 127. The attitude portion is determined in magnitude by any difference between the positions of synchros 110 and 127, the latter having been preset as described earlier. Any roll control signal on conductors 76 and 77 is transmitted through amplifier-demodulator 41 to conductors 35 and 36 of switching logic 31 and is effective as described in connection with FIGURE 8 to energize jets 24 and 27 or jets 25 and 26, depending on the sense of the signal, to apply a reactive torque opposing the spin, which is quickly reduced to zero by this means, with the vehicle in the predetermined roll attitude.

The input circuit for yaw preamplifier 240 of FIGURE 5 may be traced from conductor 242 through slider 236, the portion of winding 234 below the slider, conductors 292 and 291, resistor 287, conductors 290 and 293, and relay contacts 135d and 135e to ground connections 294 and 241. The quadrature-balanced yaw signal thus varies only with yaw rate, and is transmitted through preamplifier 240, amplifier-demodulator 34, and switching logic 30 to energize jet 22 or jet 23 in accordance with the sense of any yaw rate.

The input circuit for pitch preamplifier 212 of FIGURE 5 may be traced from conductor 214 through slider 210, the portion of winding 206 above the slider, conductors 343 and 342, resistor 340, conductors 341 and 344, and relay contacts 135g and 135h to ground connections 345 and 213. The pitch signal thus varies only with pitch rate, and is transmitted through preamplifier 212, amplifier-demodulator 42, switching logic 31 to energize the solenoids of jets 24 and 26 or jets 25 and 27 in accordance with the sense of any pitch rate.

After a delay of only a few seconds programmer 498 opens switch 502, to conserve electrical energy, and then opens switch 503 in preparation for de-energization of relay 522 later. When the progammer closes switch 504, which occurs after a sufficient interval for the vehicle to achieve a zero spin and a proper roll attitude, relay 135 is energized from conductor 515 through conductors 517 and 520, switch 504, conductor 535, and ground connections 534 and 510. The relay pulls in, performing functions in FIGURE 4 and FIGURE 5.

In FIGURE 4 the roll signal circuit may be traced as before. However, winding 137 is no longer energized with the output of synchro 127, but instead is energized through a circuit including ground connections 80a and 180 and conductor 136, relay contacts 135a and 135c, conductor 182, relay contacts 133e and 133d, and conductor 181 from synchro 166. It will be realized that by means of the initial gyroscope orientation the synchros 110 and 166 are so related that the output of 167 is zero, and remains zero during the entire pitch-over which follows, since the two gyroscopes precess equally in opposite directions. Thus the only effective roll signal is still roll rate, which controls the appropriate jets as before.

In FIGURE 5 energization of relay 135 ungrounds conductor 344, and connects it through relay contacts 135g and 135j, conductor 346, and slider 347 ot receive the voltage on winding 351 below the slider. This voltage is derived from synchro 314 through ground connections 353 and 317 and through conductor 320, relay contacts 133s and 133t, and conductors 321 and 354. No appreciable signal is received on conductor 322 because of isolation resistors 267 and 325.

Synchro 314 has been initially set to a position corresponding to that which synchro 296 will achieve after the pitch-over has been completed, so that there is presently a large positional error, and a large signal is supplied through preamplifier 212 and amplifier-demodulator 42 to logic 31, energizing the solenoids of jets 26 and 27 so as to cause the vehicle to pitch down until synchro 296 comes into positional agreement with synchro 314: energization of the jets then ceases.

Also in FIGURE 5 energization of relay 135 ungrounds conductor 293 and connects it through relay contacts 135d and 135f and conductor 295 to slider 274, so that a portion of the voltage across winding 272 is supplied to preamplifier 240. This voltage has two components, one derived from synchro 261 through ground connections 264 and 276 and through conductor 265, relay contacts 133p and 133q, conductor 266, resistor 267, and conductors 270 and 271, and one derived from synchro 314 through ground connections 317 and 276 and through conductor 320, relay contacts 133s and 133t, conductors 321 and 322, relay contacts 323a and 323b, conductor 324, resistor 325, and conductors 326 and 271. It is desired that, in the absence of yaw deviation, no signal be supplied to preamplifier 240 during the pitch-over, yet at the end of pitch-over the yaw signal must still be zero in the absence of yaw error. This is made easy to accomplish by the fact that the two gyroscopes precess through equal and opposite angles during the pitch-over. Synchro 261 may thus be set at the beginning of the pitch over to give a large error signal relative to synchro 243 equal and opposite to that from synchro 314: then signals will remain equal as they decrease during the pitch-over, so that the only signal on winding 272 is a measure of yaw error, and no operation of the yaw control jets normally takes place.

Shortly after the pitch-over is completed programmer 498 closes switch 505, energizing relay 323 from conductor 517 through conductor 521 and ground connections 536 and 510. Relay 323 acts in FIGURE 5 to open contacts 323a and 323b, thus making the pitch and yaw channels independent so the pitch signal will not affect the yaw channel.

The spin axes now have the relation to the jet axes shown in FIGURE 2: either gyroscope will respond either to pitch or to yaw. One gyroscope is connected to control the yaw jets and the other to control the pitch jets, but it will be realized that if a pure yaw error develops the correction will not be a simple one. Rather both sets of jets will fire and the craft will return to its desired attitude along a curve rather than a straight line.

Figure 15:
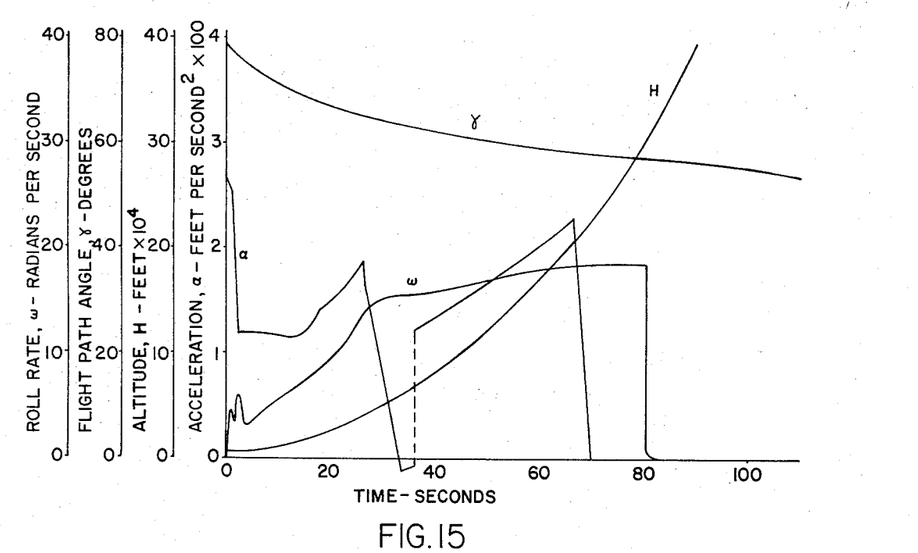
FIGURE 15 is a typical flight profile.

The velocity package should now have reached the desired pitch-over angle, and suitable telemetry apparatus will make the gyro orientation known on the ground. A principal cause of error at this time lies in the fact that a flight profile such as is shown in FIGURE 15 is a statement of what can statistically be expected to take place, and errors in burning time, wind velocity, and a multitude of other variables may result in a deviation of one or both the spin axes from the desired orientation. The trajectory of the velocity package is being followed by radar and suitable computers may determine desirable yaw and pitch corrections. These are transmitted to the velocity package and cause operation of steppers 355 and 363 until the attitude is that desired: in this attitude the package coasts until a signal is received on the same radia which is effective, independently of the apparatus described herein, to energize a pair of jet solenoids to cause the craft to spin up to 10 r.p.m., to give it stability in anticipation of firing of the third and fourth stage propulsion units. When the spin begins, switch 68 opens, disabling relay 522: power to the jet solenoids from source 466 is cut off at relay contacts 522d and 522e.

When the telemetry function has been served, the entire attitude controller is next jettisoned, having completed its function.

From the foregoing it will now have become apparent that the successful apparatus described is based on a new concept of gyro orientation in which the spin axes are initially positioned in a manner other than the conventional one. The orientation defined above is best for the normal case, but it has also been found that for certain special cases it may be desirable to base the apparatus on an initial gyro orientation in which the angles made by the spin axes with the roll axis, in their respective planes, are not 90° but are some other value, and I assert that my inventive contribution is broad enough to include initial orientations of this scope, and also orientations in which the respective planes make a dihedral angle other than 90°, where calculations indicate that errors may be decreased by doing so.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts, within the principle of the invention, to the full extent indicated by the broad general meeting of the terms in which the appended claims are expressed.

I claim as my invention:

1. The method of conducting the flight of a vehicle having first and second gyroscopes, each including inner and outer gimbal axes and a spin axes, which comprises the step of initially positioning the gyroscopes so that the outer gimbal axes are in alignment, the respective planes defined by the gimbal axes are aligned in predetermined directions, and the spin axes are so oriented in intersecting planes as to depart from a mutually orthogonal relationship by appreciable predetermined angular displacements.

2. The method of claim 1 with the further steps of mounting said vehicle on a planetary body and continuously modifying the initial positions of said gyroscopes in accordance with the rotation of said body.

3. The method of claim 1 with the further steps of mounting said vehicle in an angularly movable launcher and continuously modifying the initial positions of said gyroscopes in accordance with angular motions of said launcher.

4. The method of claim 1 with the further steps of mounting said vehicle in a launcher angularly movable on a planetary body and continuously modifying the initial positions of said gyroscopes in accordance with the rotation of said body and angular movements of said launcher.

5. In combination with an aerodynamically unstable vehicle which is to initially rise generally vertically from an angularly movable launcher on the surface of a rotating planetary body, for a predetermined interval, and to subsequently pitch-over toward the body through a predetermined angle of generally ninety degrees; a pair of gyroscopes each having mutually perpendicular inner and outer gimbal axes and mutually perpendicular inner gimbal and spin axes; means mounting said gyroscopes in the vehicle with said outer gimbal axes aligned with the longitudinal axis of said vehicle; means initially positioning said gyroscopes so that the dihedral angle between the planes defined respectively by the gimbal axes of said gyroscopes has a predetermined value, and the angle between the spin axes and the line of intersection of said planes depart from an orthogonal relationship by the angular drift anticipated to result from the rotation of the vehicle during said interval; means for continuously modifying the initial positions of said gyroscopes in accordance with angular movement of said launcher; means for causing initial longitudinal movement of the vehicle from said launcher and simultaneous rotation of the vehicle about the longitudinal axis thereof; means for arresting said rotation of said vehicle at the end of said interval; means for positioning the vehicle in a predetermined relationship to the plane defined by the gimbal axes of one of said gyroscopes; means operable to thereafter cause rotation of said vehicle about an axis perpendicular to said plane; and means for thereafter controlling the attitude of the vehicle, about mutually perpendicular axes normal to said longitudinal axes, in accordance with the angles between the inner and outer gimbals of both said gyroscopes.

References Cited

UNITED STATES PATENTS

| | | | |
|---|---|---|---|
| 2,512,279 | 6/1950 | Jones | 74—5.34 |
| 2,770,452 | 11/1956 | Miller | 74—5.34 X |
| 2,879,670 | 3/1959 | Ambrose et al. | 74—5.34 |
| 2,932,467 | 4/1960 | Scorgie | 244—14 |
| 2,949,785 | 8/1960 | Singleton et al. | 75—5.34 |
| 2,989,270 | 6/1961 | Waldow | 244—14 |
| 3,282,119 | 11/1966 | Shaw et al. | 74—5.34 |

BENJAMIN A. BORCHELT, *Primary Examiner.*

W. C. ROCH, T. H. WEBB, *Assistant Examiners.*